A. C. BUTH.
SELF FEEDER.
APPLICATION FILED JUNE 2, 1919.
1,337,436. Patented Apr. 20, 1920.
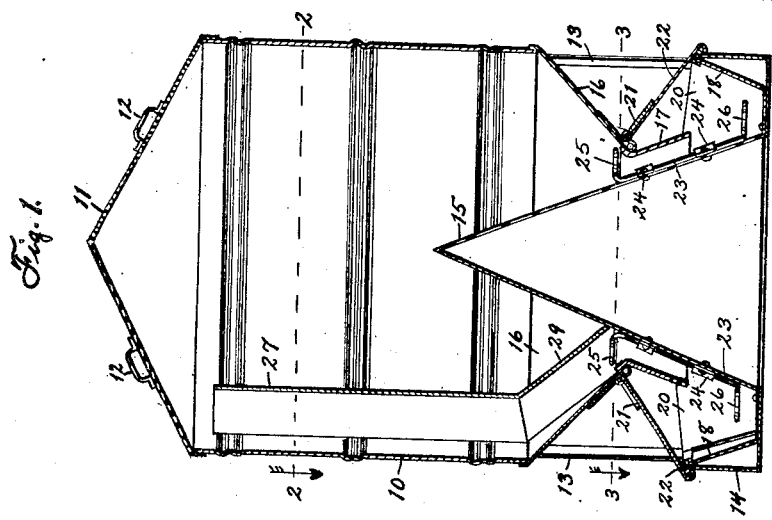
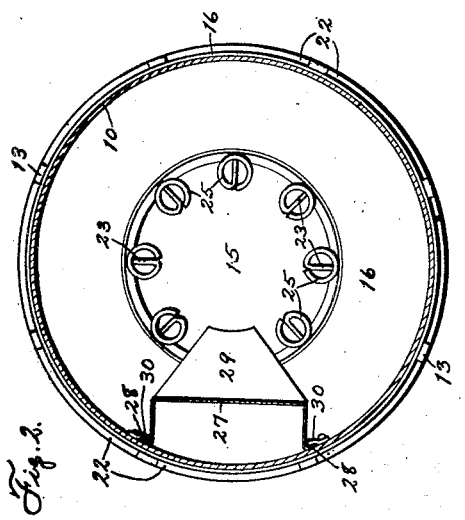
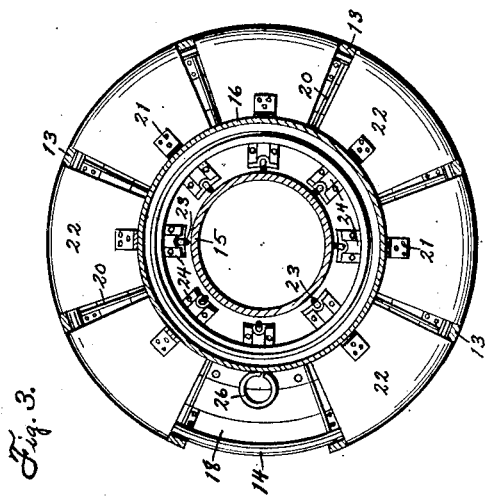
INVENTOR:
A. C. BUTH
By
Earl M. Sinclair
Atty.

UNITED STATES PATENT OFFICE.

ARCHIE CARROLL BUTH, OF ALLEMAN, IOWA.

SELF-FEEDER.

1,337,436.　　　　Specification of Letters Patent.　　Patented Apr. 20, 1920.

Application filed June 2, 1919. Serial No. 301,149.

*To all whom it may concern:*

Be it known that I, ARCHIE C. BUTH, a citizen of the United States of America, and resident of Alleman, Polk county, Iowa, have invented a new and useful Self-Feeder, of which the following is a specification.

The object of this invention is to provide an improved construction for a feeding device for supplying feed to hogs and other animals.

A further object of this invention is to provide an improved feeder which shall be closed when not in use and yet be readily accessible when food is wanted, and which is sanitary and prevents waste of food.

A further object of this invention is to provide improved means for automatically supplying food from a magazine to the feeding troughs or compartments.

A further object of this invention is to provide improved means for supplying tankage and the like as well as dry food, of various kinds.

My invention consists in the construction, arrangement and combination of elements hereinafter set forth, pointed out in my claims and illustrated by the accompanying drawing, in which—

Figure 1 is a central vertical section of the complete device. Fig. 2 is a horizontal section on the line 2—2 of Fig. 1. Fig. 3 is a horizontal section on the line 3—3 of Fig. 1, one of the doors being removed.

In the construction of the device as shown the numeral 10 designates a cylindrical tank or receptacle preferably made of sheet metal and provided with a removable cone or dome shaped cover 11 having handles 12. The receptacle 10 is mounted in upright position and is supported by spaced standards 13 above a feeding pan 14, which also is of sheet metal and may be of annular form and of substantially the same diameter as the said receptacle. A cone 15 is mounted centrally of and within, and secured to the bottom of the feeding pan 14 and extends a considerable distance upwardly within the receptacle 10. The receptacle 10 is formed with a hopper bottom 16 fixed to its lower margin and extending downwardly and inwardly at a suitable angle toward the cone 15, but spaced at its lower margin from said cone so that an annular restricted opening is formed between said members for the passage of feed to the feeding pan. If desired an apron 17 may be secured to the lower margin of the hopper bottom 16 and extend downwardly and outwardly substantially parallel with the side wall of the cone, to direct food from the receptacle downwardly alongside the cone to the feeding pan, the lower margin of said apron preferably being substantially in the same horizontal plane as the top of the feeding pan. In order to eliminate square corners at the bottom of the feeding pan, a false wall 18 of annular form preferably is mounted within said pan and has its upper margin in contact with and secured to the top of said pan, and inclined downwardly and inwardly and secured to the bottom of the pan. In practice the false wall 18 may be integral with the cone 15 if desired. The feeding pan 14 is divided into any suitable number of separate feeding compartments by means of radially arranged partitions 20, the number and location of the partitions preferably corresponding to the number and location of the standards 13, which thus serve to separate the several feeding compartments. A door 21 is provided for each of the feeding compartments, each of said doors being of segmental shape and secured at its upper margin by a hinge 22 to the outer surface of the hopper bottom 16. The doors substantially fill the spaces between adjacent standards 13 and partitions 20, and normally extend downwardly and outwardly from their hinge connections and rest loosely upon, but extend beyond, the top margin of the feeding pan 14. The projection of the doors 22 beyond the margin of the feeding pan is sufficient that an animal can readily gain access to the pan by inserting his nose beneath such projecting portion, the door resting on his head while he is feeding, and returning by gravity to closing position when the animal's head is withdrawn. This prevents entrance of rain and snow to the feeding compartments, keeps out rodents and other animals, and tends to prevent the animals which are to be fed from the device from getting into and wasting the feed.

An agitator 23 may be provided for each feeding compartment and may be composed of a length of heavy wire or rod. Each agitator 23 is slidingly mounted in clips 24 carried by the outer surface of the cone 15. Each agitator is bent at its upper end to form a loop 25, in substantially a horizontal plane, and at its lower end to form a loop 26 similarly arranged. The lower loops 26 normally are spaced somewhat above the bottom of the feeding pan and may be engaged by the nose of an animal in search of food, to raise and perhaps slightly turn the agitators, the upper loops acting to dislodge food substances which may have become clogged in the restricted annular space between the cone and hopper bottom 16. The upper loops 25 engage the inner portion of the hopper bottom and limit downward movement of the agitators.

A magazine 27 may be formed of sheet metal and be mounted within and at one side of the receptacle 10, to receive tankage or similar substances desired to be fed to hogs in connection with grains and the like. The magazine 27 is formed with flanges 28 adapted to be received in vertical slide bearings 30 formed on the inner surface of the side wall of the receptacle 10, so that said magazine may be removed or replaced relative to the receptacle when the cover 11 is removed. The magazine 27 is formed with an inwardly inclined portion 29 at its lower end conforming to the inclination of the hopper bottom 16 and communicating with the space between the apron 17 and cone 15.

I claim as my invention—

1. In an automatic feeding device having an annular pan, a cone centrally located on and rising from said pan and a superposed receptacle having a hopper bottom coacting with and spaced from the cone, the combination with said pan of a false bottom contained therein and having a frusto-conical outer wall, radial partitions subdividing the space within said false bottom, and segmental doors hinged to said hopper bottom and overlapping the walls of the pan and false bottom.

2. In an automatic feeding device having an annular pan, a cone centrally located on and rising from said pan, a superposed receptacle having a hopper bottom coacting with and spaced from the cone and spaced standards connecting said pan and receptacle, the combination with said pan of a false bottom contained therein and having a frusto-conical outer wall, radial partitions subdividing the space within said false bottom, and segmental doors hinged to said hopper bottom and overlapping the walls of said pan and false bottom, said segmental doors alternating with and being spaced apart to accommodate said standards.

3. In a feeding device having an annular pan, a cone centrally mounted in and rising from said pan, and a superposed receptacle having a hopper bottom coacting with said cone, the cone extending through the hopper bottom and being spaced from the lower margin thereof, the combination with said receptacle, hopper bottom and cone of a magazine member vertically mounted in and coacting with a portion of the wall of said receptacle, said magazine member being formed with a discharge portion inclined similarly to and coacting with a portion of the hopper bottom, a portion of the wall of the receptacle and of the bottom forming a part of the inclosure defined in part by the magazine member, said discharge portion of the magazine member having an open lower end contacting with said cone, and adapted to discharge into the space between said cone and the hopper bottom.

4. A feeding device, comprising a feeding pan, a receptacle supported above and in spaced relation to said pan, a cone mounted within and centrally of said pan and projecting upwardly within said receptacle, said receptacle being formed with an inwardly inclined hopper bottom spaced somewhat at its inner margin from said cone, and agitators slidably mounted on the outer surface of said cone and formed with relatively flat members turned outwardly and adapted to rest on the inclined bottom.

5. In a feeding device having a circular receptacle formed with a hopper bottom and a feed pan communicating with said hopper bottom, the combination with said receptacle and hopper bottom of a magazine member removably and replaceably mounted in and shaped to conform with and arched oppositely to the wall of said receptacle and bottom, a portion of the wall of the receptacle and of the bottom forming a part of the inclosure defined in part by the magazine member, said magazine when in place leading from a point near the top of the receptacle and discharging to said feeding pan through said hopper bottom.

6. In a feeding device having a circular receptacle formed with a hopper bottom and a feed pan communicating with said hopper bottom, the combination with said receptacle and hopper bottom of slide bearings formed on the inner surface of the wall of said receptacle, and a magazine member formed with flanges adapted for reciprocation in said slide bearings, said magazine member being shaped to conform with and arched oppositely to the wall of said receptacle and bottom, a portion of the wall of the receptacle and of the bottom forming a part of the inclosure defined in part by the magazine member.

7. In a feeding device, an annular pan formed with a hole at its center, a cone superposed on the pan and having its base surrounding said hole, and a frusto-conical false bottom mounted in said pan and having its base margin fixed to the rim of said pan, together with radial partitions secured to and subdividing said false bottom and segmental doors mounted for articulation relative to and overlying the spaces between said partitions respectively.

8. In a feeding device having a feeding pan, a deflector mounted therein and a receptacle formed with a hopper bottom superposed relative to, surrounding and spaced from said deflector, the combination with said hopper bottom and deflector of a plurality of agitators extending through the space between them, each of said agitators being formed with a central body slidingly mounted on said deflector, an outturned member overlying the lower edge of the hopper bottom and extending across the space contiguous thereto, and an outturned member extending within the space outside the base of said deflector.

Signed at Alleman, in the county of Polk and State of Iowa, this 5th day of May, 1919.

ARCHIE CARROLL BUTH.